United States Patent [19]

Wood

[11] Patent Number: 4,722,236

[45] Date of Patent: Feb. 2, 1988

[54] DEVICES FOR CONVERTING ROTARY MOVEMENT TO LINEAR MOVEMENT

[75] Inventor: Ronald A. E. Wood, Nottingham, United Kingdom

[73] Assignee: RHP Group Plc, Billericay, United Kingdom

[21] Appl. No.: 819,079

[22] Filed: Jan. 15, 1986

[30] Foreign Application Priority Data

Feb. 14, 1985 [GB] United Kingdom ............... 85-03776

[51] Int. Cl.⁴ ............................................. F16H 21/16
[52] U.S. Cl. ....................................................... 74/89
[58] Field of Search ....................................... 74/89, 25

[56] References Cited

U.S. PATENT DOCUMENTS

| | | | |
|---|---|---|---|
| 2,756,609 | 7/1956 | Hogan et al. | 74/459 |
| 3,777,578 | 12/1973 | Swanberg | 74/89 |
| 3,903,748 | 9/1975 | Krogsrud | 74/25 |
| 3,958,678 | 5/1976 | Jeter | 192/45 X |
| 4,034,833 | 7/1977 | Jeter | 192/45 |

FOREIGN PATENT DOCUMENTS 2121507 12/1983 United Kingdom ..................... 74/89

Primary Examiner—Thomas F. Callaghan
Attorney, Agent, or Firm—Sughrue, Mion, Zinn, Macpeak and Seas

[57] ABSTRACT

A device for convering rotary to linear motion is composed of at least one ring surrounding a shaft or tube with balls running in a part-helical track in the ring or shaft. The balls are radially pre-loaded and a slot intersects the end and the start of the track to provide punctiform ball contact zones. One ball is then transferred at a time free of load from the end to the start of the track as the ring rotates. Side covers have profiles on their inner surfaces to control laterally the ball being transferred.

16 Claims, 12 Drawing Figures

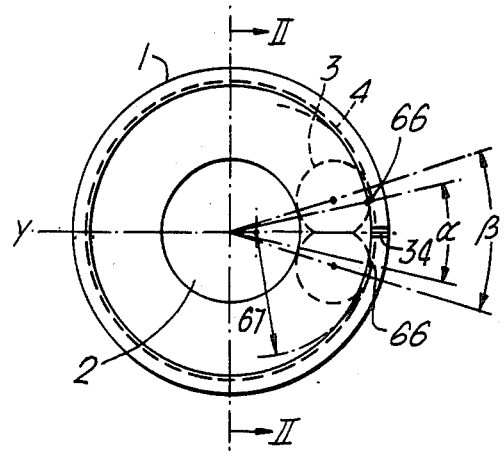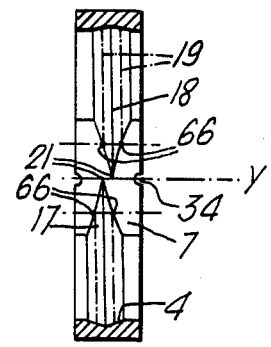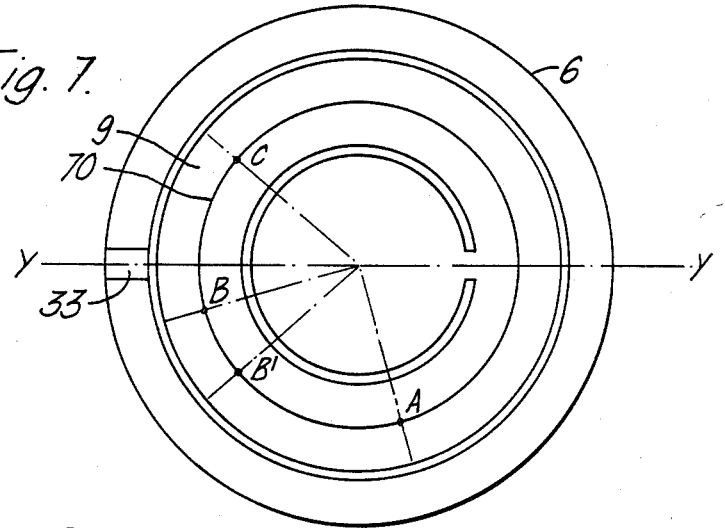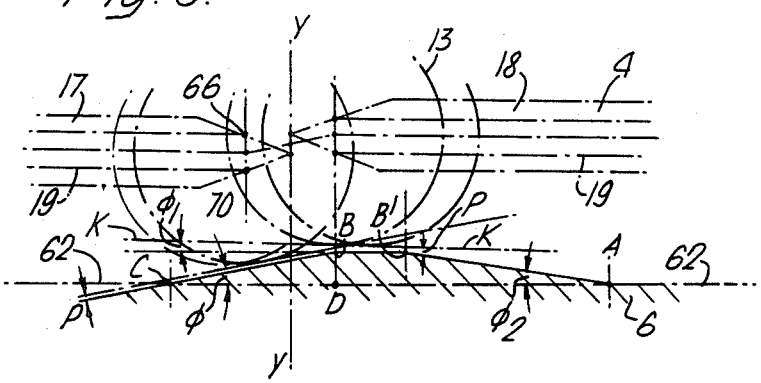

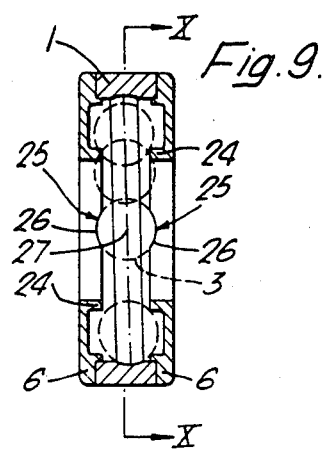
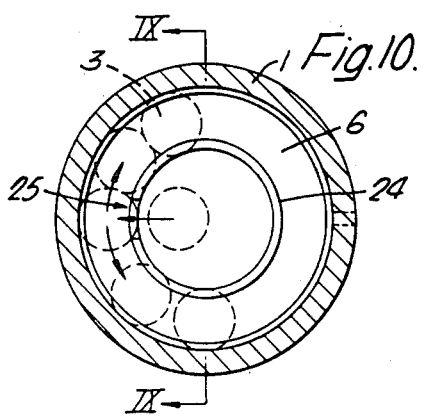
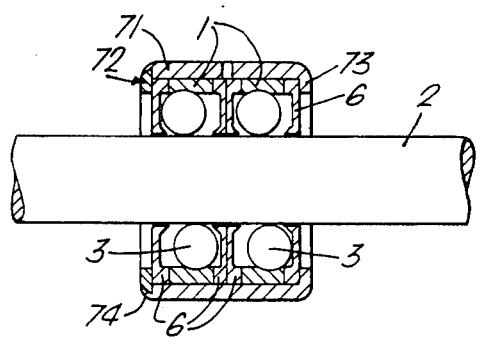
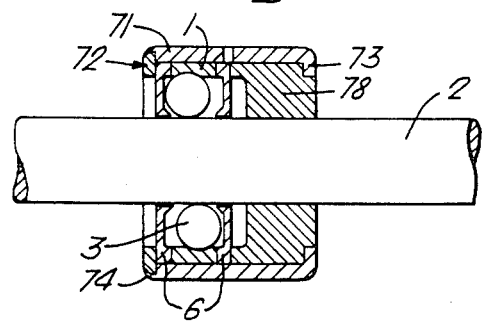

DEVICES FOR CONVERTING ROTARY MOVEMENT TO LINEAR MOVEMENT

FIELD OF THE INVENTION

The present invention relates to devices for converting rotary movement into linear movement.

BACKGROUND TO THE INVENTION

The invention is concerned with devices of the type described in U.S. patent application Ser. No. 497,979; filed May 25, 1983 and assigned the same assignee as this application, and which has a published equivalent GB No. 2121507A. As is known per se, a device constructed in accordance with the present invention is composed of first and second components such as a ring and a shaft. These components rotate about a common axis and have confronting surfaces one of which is plain while the other is provided with a groove forming a raceway or track of at least part helical configuration. Balls are disposed between the confronting surfaces in mutual contact therewith under radial pre-load and the balls are guided for progressive continuous rolling movement along the track. The arrangement is such that direct linear motion between the components is resisted but linear motion of one component can be achieved by rotation of the other component. The balls are guided to transfer, parallel to the common rotational axis, between the start and end of the track.

SUMMARY OF THE INVENTION

The object of this invention is to improve the design and performance of the known devices.

In one aspect of the invention the track and ball guidance are so designed that only one ball is in transference and out-of-load at any one time. The groove forming the track may be V-shaped with terminal end regions tapered progressively to become shallower and terminate on a line parallel to the axis of rotation. A slot or channel can assist in the tranference of the balls. This slot may be curvilinear to intersect a ball contact path of the track and provide the track with defined punctiform ball contact zones for ball transference.

As also described in GB No. 2121507A, side covers with guides can also assist the transfer of the balls from the end to the start of the track. In further development of this, the invention provides, in another aspect, a cam profile on the inner surface of the side cover which has a plurality of surfaces which projected linearly, incline at different angles in relation to a plane perpendicular to the axis of rotation. Conveniently, the cam profile includes a first surface region adapted to contact and control a ball in transference between the end to the start of the track. This first region extends substantially tangential to said ball as it leaves the end of the track. Preferably a further surface region of the cam profile adjoins the first region and extends parallel to the track and substantially tangential to said ball as it enters the start of the track. This further region can then lead to a run-off region of the cam profile which does not contact the ball.

To bring the cam profile into a correct orientation the cover and the component with the track can have inter-engageable means such as a projection and recess.

Each of the side covers may be additionally or alternatively provided with an inwardly-directed peripheral flange relieved with a recess or cut-out. This facilitates fitting of the balls to a plain shaft, for example.

A pair of units each composed of a ring with a track, a set of balls and side covers may be disposed side-by-side on a common shaft and held together by a common housing. Alternatively one unit composed of a ring with a track, a set of balls and side covers may be disposed alongside a bushing or similar plain bearing engaging on a shaft. A common housing would then hold the plain bearing and the one unit together in side-by-side relation. These double units are useful in maintaining the shaft square with the ring or rings.

The present invention may be understood more readily, and various other features of the invention may become apparent, from consideration of the following description.

BRIEF DESCRIPTION OF THE DRAWINGS

FIG. 5 is a schematic end view of a device constructed in accordance with the invention;

FIG. 6 is a sectional side view of the ring of the device represented in FIG. 5, this section being taken along the line II—II of FIG. 1;

FIG. 7 is an end view of the inside of a cover used with the device shown in FIGS. 5 and 6, the view being taken on a somewhat larger scale to that adopted in FIGS. 5 and 6;

FIG. 8 depicts the start and the end of the track of the ring of the device in relation to one of the balls thereof and in conjunction with the profile of a cam surface on the cover shown in FIG. 7;

FIG. 9 is a sectional elevation of another device constructed in accordance with the invention, the view being taken along the line IX—IX of FIG. 10;

FIG. 10 is a sectional end view of the device shown in FIG. 9, the view being taken along the line X—X of FIG. 9;

FIG. 11 is a part-sectional elevation of a further device constructed in accordance with the invention; and FIG. 12 is a part-sectional elevation of a further device constructed in accordance with the invention.

An embodiment of the invention will now be described by way of example only with reference to the accompanying drawings.

Figure 1:
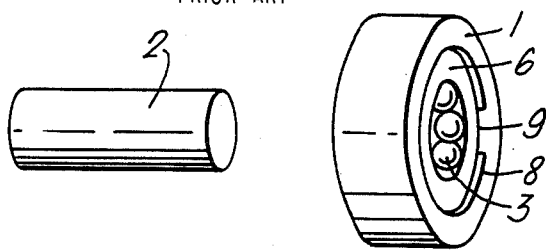
FIG. 1 is a perspective exploded view of a known device.
Figure 2:
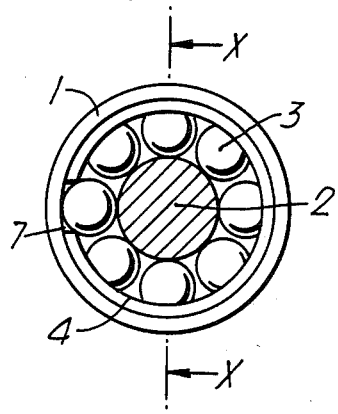
FIG. 2 is an end view of the known device with one of the covers removed.
Figure 3:
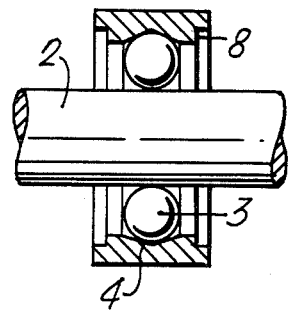
FIG. 3 is a part-sectional side elevation of the device shown in FIG. 1 with the covers removed.
Figure 4:
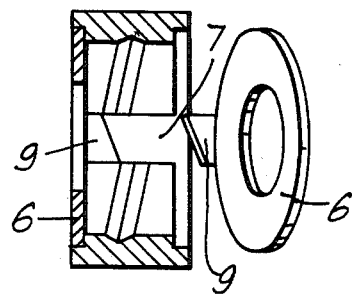
FIG. 4 is a part-sectional and part-exploded side view of the ring and covers of the known device.

As described in GB No. 2121507A, and shown in FIGS. 1 to 4, a device for converting rotary motion into linear motion is composed of one component in the form of a ring 1 with a track 4 on its inner surface which confronts a plain surface of another component, for example, a shaft, tube or spindle 2. The ring 1 and the shaft 2 mutually contact rolling elements in the form of balls 3. The balls 3 locate in the track or raceway 4 and are guided for progressive rolling motion around the track 4. The ring 1 has recesses 8 in its side faces for receiving annular covers 6. The track 4 takes the form of a symmetrical part-helical V-shaped groove. The track 4 wedges with the balls 3 and the balls 3 are subjected to radial pre-loading to ensure that direct linear axial motion between the ring 1 and the shaft 2 cannot occur but torque applied to the ring 1 or the shaft 2 will impart linear motion to the other component. The balls 3 are guided for continuous movement in succession around the longitudinal axis of the shaft 2. A transverse slot 7 in the ring 1 and the guides 9 on the covers 6 collectively serve to transfer the balls 3 from the end to the start of the track 4. During assembly of the device, the balls 3 can be placed in the track 4 and the covers 6 fitted. The shaft 2, which may have a lead chamfer at one end, can then be rotated to feed within the balls. Alternatively, the outer ring 1 with only one cover 6 fitted can be placed over the shaft 2 and the balls 3 fed into the track 4 through the slot 7. The other cover 6 is then fitted.

DESCRIPTION OF PREFERRED EMBODIMENTS

In FIGS. 5 and 6, the end and the start of the track 4, in the form of a V-shaped groove in the ring 1 are designated 17 and 18, respectively, and the ball contact path with the track 4 is designated 19. Since the balls 3 can progress in either direction, i.e. clockwise or anticlockwise in FIG. 1, the start and end 17, 18 can be reversed. These terminal regions 17, 18 of the track 4 which define the start and end or vice versa are designed so that only one ball is out-of-load and being transferred from the end 17 to the start 18 at any one time. A ball 3 symmetrically positioned with respect to the regions 18 and 17 contacts these regions over punctiform contact zones 66 and loses contact with one or the other of the zones 66 during transference. The zones 66 are defined by the intersection of the ball contact path 19 and the slot 7. Part of FIG. 8 depicts a ball 3 during its transfer. The depth of the slot 7 on the line Y—Y is sufficient to ensure that the ball 3 being transferred from the end 17 to the start 18 of the track 4 is relieved of its radial pre-load, and preferably coincides with apices 21 at the extreme ends of the track 4. The slot 7 preferably has a curvilinear profile defined with a radius of curvature 67 which intersects the ball contact path 19 in a manner to provide the zones 66 at locations such that the angle $\alpha$ therebetween is not greater than, and preferably somewhat less than, the angle $\beta$ between the centres of two adjacent mutually-contacting balls 3 disposed symmetrical about the line Y—Y.

As illustrated in FIG. 7, each side cover 6 which is fitted to the ring 1 has a guide 9 on its inner surface which serves to control the balls 3 in their transfer between the end regions 17, 18 in either direction of progression. The guide 9 is integral with the cover 6 and takes the form of a cam with a profile 70 developed in FIG. 8 around a circle described by the running pitch diameter of the balls 3. The maximum lateral displacement caused by the lift of the cam profile is designated B-D. The angle $\phi$ over the rise of the cam profile region C-B is dependent on the pitch circle diameter of the balls, the diameter and the lead of the track 4. For a range of devices, the angle $\phi$ can be typically from 2° to 35°. The region C-B is substantially almost tangential to the ball 3 being transferred as it leaves the end region 17 with a small running clearance p. The cam profile region B—B' is parallel to the track 4 and extends at an angle $\phi1$ in relation to a plane K—K parallel to the inner datum surface 62 the cover 6. The region B—B' is substantially tangental to the ball 3 entering the start region 18 with the same small running clearance p. The cam profile region B'-A is non-operative in relation to ball transference, and its associated angle $\phi2$ is not critical. It just serves to bring the cam profile 70 back to the inner surface 62 of the cover 6. The cam profile region B—B' is present to ensure the relative orientation of the cam profile lift B-D in relation to the slot 7 is less critical so that control can be maintained over a greater part of the running pitch circle, and manufacturing tolerances need not be too onerous. The angles $\phi$ and $\phi1$ are themselves quite critical and should be realised with a tolerance of preferably ±0.5°. The cam profile 70 on the opposite cover 6 would also conform to that shown.

The covers 6 each have location means in the form of a small rib or projection 33 which engages in a matching recess 34 in the ring 1 to bring the cam profile 70 into the correct orientation relative to the slot 7, and conveniently the projection 33 on each cover 6 is disposed radially of the cover 6 for location in the recess 34 on the line Y—Y.

In some applications it is desirable to supply the ring 1 and the covers 6 and to match the balls 3 with a particular shaft 2 during assembly. To facilitate the fitting of the balls 3 it is useful to modify the covers 6 in the manner depicted in FIGS. 9 and 10. As shown the covers 6 are provided with inwardly-directed peripheral flanges 24 which retain the balls 3. The flanges 24 are relieved as at 25 with semi-circular or arcuate cut-outs 26 to provide therebetween a gap 27. The gap 27 is slightly smaller than the diameter of the balls 3 but permits the balls 3 to be snap-fitted one after another to surround the shaft 2 as indicated by the arrows in FIG. 10.

A pair of rings 1 with balls 3 and covers 6 constructed as described in connection with any one or more of FIGS. 5 to 8 can be fitted side-by-side on a common shaft 2 as shown in FIG. 11. In this arrangement, a common housing 71 surrounds the rings 1 and has a radial flange 73 at one end. This flange 73 in conjunction with a clamping washer (or retention clip) 72 fitted in a recess or slot 74 at the opposite end of the housing 71 holds the rings 1 and the covers 6 in position. This arrangement is particularly useful in maintaining the correct alignment between the device and the shaft 2. It is, however, not necessary to use two sets of rings 1 etc in tandem in all cases and FIG. 12 depicts a further arrangement where a single device 1, 3, 6 is mounted next to a bush serving as a plain bearing 78 with the common housing 71 again used as in the FIG. 11 construction.

I claim:

1. In a device comprising first and second components (1, 2) relatively rotatable about a first common axis, the components having confronting surfaces, one of which is substantially plain while the other is provided with a groove (4) forming a raceway or track of part helical form, a plurality of balls (3) disposed between the surfaces under radial pre-loading and guided for progressive rolling movement along the track in a manner to wedge therewith and resist direct linear motion betwen the components in the axial direction and to convert rotary movement of one component into linear movement of the other component, a slot (7) in the other component through which the balls are transferred from the end (17) to the start (18) of the track, and guide means (9) for effecting the transfer of balls through the slot; the improvement comprising the guide means and an intersection region between the end and the start of the track and the slot being configured to control the transference and guidance of the balls from the end to the start of the track in axial and circumferential directions to permit only one ball to be transferred at one time, and to render said one ball in an out-of-load condition.

2. A device according to claim 1, wherein the slot extends axially to intersect a ball contact path of the track in a manner to provide punctiform ball contact load zones at terminal regions providing the end and start of the track.

3. A device according to claim 2, wherein the slot is curvilinear and the groove is V-shaped.

4. A device according to claim 3, wherein the depth of the groove tapers over the terminal regions to become progressively shallower and terminate at or closely adjacent to a common line parallel to the common axis.

5. A device according to claim 2, wherein the angle between the contact zones at the respective terminal regions is less than the angle between the centres of a pair of contacting balls symmetrically located with respect to the terminal regions.

6. A device according to claim 1 wherein side covers extend radially between the components and each side cover has a cam-profiled guide surface (70) on its inside which forms the guide means to guide the balls in their transference.

7. A device according to claim 6, wherein the profile of the guide surface has a first inclined region (CB) adapted to contact and progressively control a ball in transference between the end and the start of the track.

8. A device according to claim 7, wherein the profile of the guide surface has a second region (BB') which is substantially parallel to the track and adjoins said first region.

9. A device according to claim 7, wherein the profile of the guide surface has another region (B'A) which does not contact a ball but leads the cam back to the inner face of the cover.

10. A device according to claim 7 wherein the first region extends near tangentially to the transferred ball when this leaves a terminal region forming the end of the track.

11. A device according to claim 8, wherein the second region extends near tangentially to the transferred ball when this enters a terminal region forming the start of the track.

12. A device according to claim 6, wherein the guide surface is composed of a plurality of surfaces which, extended linearly and incline at different angles to a plane perpendicular to the axis of rotation.

13. A device according to claim 6, wherein the side covers and the other component have interengageable location means serving to locate the covers with their guide surfaces correctly positioned in relation to the end and the start of the track.

14. A device according to claim 6, wherein the side covers have inwardly-directed peripheral flanges which serve to retain the balls, said flanges being relieved to provide a gap through which the balls can be passed in succession during assembly.

15. A device according to claim 1, wherein a common shaft constitutes the component with a plain surface for a pair of ring components each with its own set of balls and side covers, and a housing surrounds the components and maintains these in side-by-side relationship.

16. A device according to claim 1, wherein said one component is a shaft and a plain bearing is mounted on the shaft and is maintained in side-by-side relationship with the other component and its set of balls with the aid of a housing.

* * * * *